(12) United States Patent
    Zeng et al.

(10) Patent No.:     US 12,558,631 B2
(45) Date of Patent:         Feb. 24, 2026

(54) GAME MANAGEMENT METHOD, AND APPARATUS, DEVICE AND COMPUTER-READABLE STORAGE MEDIUM

(71) Applicant: TENCENT TECHNOLOGY (SHENZHEN) COMPANY LIMITED, Shenzhen (CN)

(72) Inventors: Peiyuan Zeng, Shenzhen (CN); Chenxing Pei, Shenzhen (CN); Weisong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 302 days.

(21) Appl. No.: 18/343,090

(22) Filed: Jun. 28, 2023

(65) Prior Publication Data

US 2023/0338859 A1     Oct. 26, 2023

Related U.S. Application Data

(63) Continuation of application No. PCT/CN2022/123992, filed on Oct. 9, 2022.

(30) Foreign Application Priority Data

Dec. 10, 2021    (CN) .......................... 202111509889.2

(51) Int. Cl.
     *A63F 13/798*          (2014.01)
     *A63F 13/52*           (2014.01)
     *A63F 13/537*          (2014.01)
(52) U.S. Cl.
     CPC ............ *A63F 13/798* (2014.09); *A63F 13/52* (2014.09); *A63F 13/537* (2014.09); *A63F 2300/308* (2013.01)

(58) Field of Classification Search
     CPC ........ A63F 13/798; A63F 13/79; A63F 13/52; A63F 13/537; A63F 2300/308
     See application file for complete search history.

(56) References Cited

U.S. PATENT DOCUMENTS 10,872,501 B1 *  12/2020  Georgilas ................ G07F 17/34
2006/0019743 A1 *  1/2006  Roemer .................. G07F 17/32
                                                                463/26

(Continued)

FOREIGN PATENT DOCUMENTS

CN        109200588 A      1/2019
CN        112704873 A      4/2021

(Continued)

OTHER PUBLICATIONS

The World Intellectual Property Organization (WIPO) International Search Report for PCT/CN2022/123992 Jan. 5, 2023 5 Pages (including translation).

(Continued)

*Primary Examiner* — Steve Rowland
(74) *Attorney, Agent, or Firm* — Anova Law Group, PLLC

(57)                    ABSTRACT

This application discloses a game management method, and apparatus, a device and a computer-readable storage medium, and belongs to the field of network technologies. The method includes displaying a game interface with a first content in response to that a runtime of a target game is in a first time period and the target game is in a ranking game mode, the first content indicating a base number of times to accelerate the acquisition of first resources that can be applied in the first time period; and displaying a second content in response to receiving a selection instruction for the first content, the second content comprising a first additional quantity of the first resources acquirable by applying one of the base number of times in the first time (Continued)

period, the first additional quantity being determined based on a current game level of a user and used for changing a game level of the user.

18 Claims, 5 Drawing Sheets

(56) References Cited

U.S. PATENT DOCUMENTS

| | | | | |
|---|---|---|---|---|
| 2008/0113780 | A1* | 5/2008 | Vallejo | G07F 17/3258 |
| | | | | 463/27 |
| 2010/0120484 | A1* | 5/2010 | Caputo | A63F 13/80 |
| | | | | 463/43 |
| 2015/0126269 | A1* | 5/2015 | Linden | A63F 13/30 |
| | | | | 463/31 |
| 2018/0345143 | A1* | 12/2018 | Baker | A63F 13/25 |
| 2023/0338859 | A1 | 10/2023 | Zeng et al. | |

FOREIGN PATENT DOCUMENTS

| | | |
|---|---|---|
| CN | 114146409 A | 3/2022 |
| JP | 2021040700 A | 3/2021 |
| JP | 2021112362 A | 8/2021 |
| JP | 6952847 B1 | 10/2021 |
| WO | 2013085221 A1 | 6/2013 |

OTHER PUBLICATIONS

The Japan Patent Office (JPO) Notification of Reasons for Refusal for Application No. 2024-521028 Feb. 2, 2025 6 Pages(including translation).

Prior art documents: Fortnite Season 7 Battle Pass Rewards, IGN [online], 2 Dec. 7, 018, [Retrieved on Feb. 20, 2025], Internet: <URL:https://www.ign.com/wikis/fortnite/Fortnite_Season_7_Battle_Pass_Rewards>.

Rank match Season11 started with "Gundam Batope NEXT". "Double Orizer" Chance to Get It in Advance, 4 Gamer. net [online], Mar. 14, 2017, [Retrieved on Feb. 20, 2025], Internet: <URL: https://www.4gamer.net/games/300/G030027/20170314043/>.

[Apex] What is XP Boost? (Effects, usage, period, how to check?), Sin's log [online], Aug. 28, 2021, [Retrieved on Feb. 20, 2025], Internet: <URL:https://sinzlog.com/apex-xp-boost-what/>.

Valorant Patch Note 3.05, Riot Games [online], Aug. 9, 2021, [retrieved on Feb. 20, 2025], Internet: <https://playvalorant.com/ja-jp/news/game-updates/valorant-patch-notes-3-05/>.

* cited by examiner

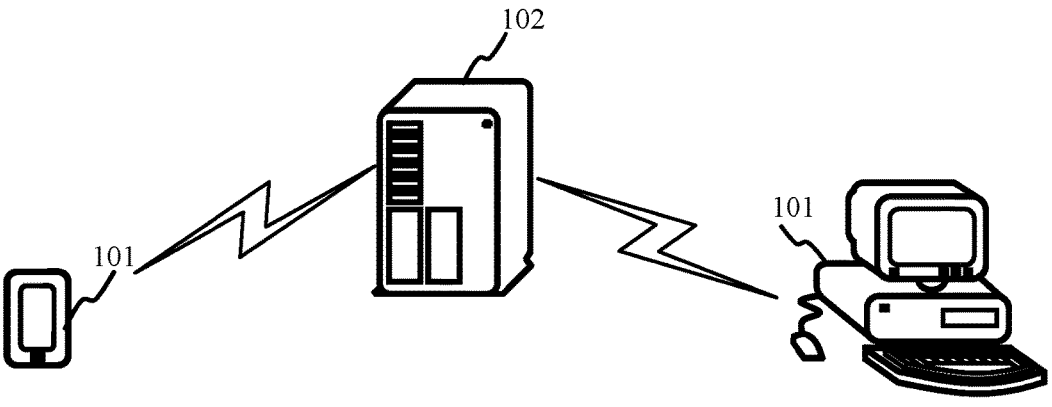

FIG. 1

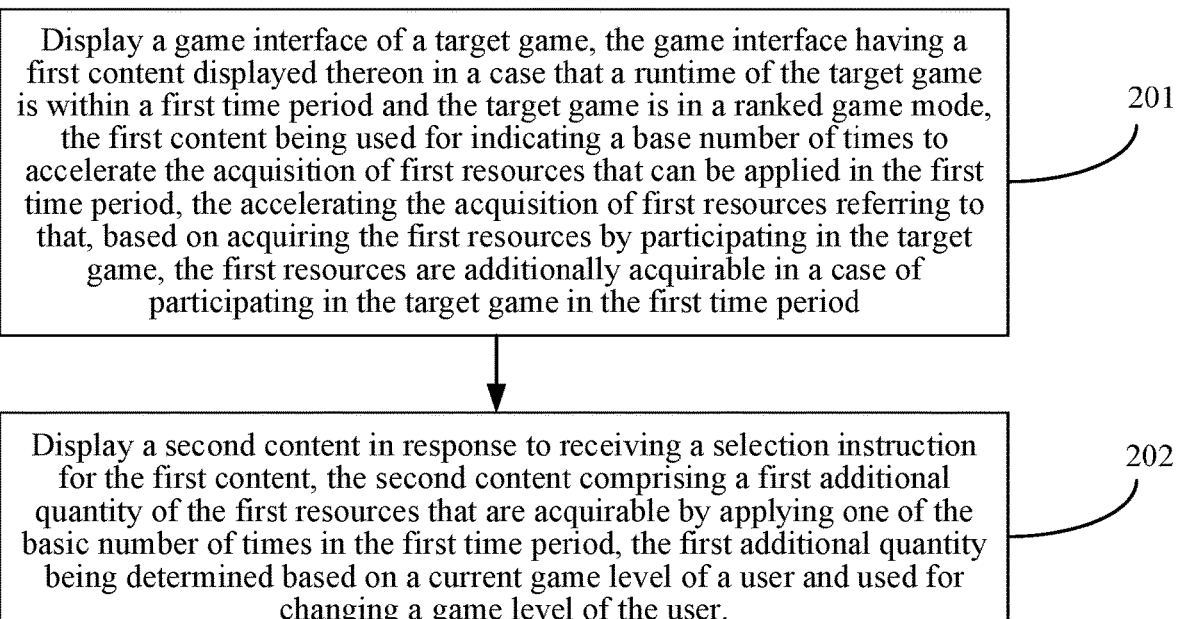

Display a game interface of a target game, the game interface having a first content displayed thereon in a case that a runtime of the target game is within a first time period and the target game is in a ranked game mode, the first content being used for indicating a base number of times to accelerate the acquisition of first resources that can be applied in the first time period, the accelerating the acquisition of first resources referring to that, based on acquiring the first resources by participating in the target game, the first resources are additionally acquirable in a case of participating in the target game in the first time period

201

Display a second content in response to receiving a selection instruction for the first content, the second content comprising a first additional quantity of the first resources that are acquirable by applying one of the basic number of times in the first time period, the first additional quantity being determined based on a current game level of a user and used for changing a game level of the user.

Level 3 season journey

3/4          09:59:06

604   605   606   607

< Season Journey

12223

Season Journey 4 Orianna skin
Orianna skin in Season Journey
4 can be obtained by reaching a
track level of the Season
Journey

609

Additional
rewards          [?]

601

Journey          Ranked
value +10      coin +20

608

3/4      09:59:06

610

Basic rewards  [?]

602

Journey          Ranked
value +6        coin +10

Season Journey

Ranked store

603

GAME MANAGEMENT METHOD, AND APPARATUS, DEVICE AND COMPUTER-READABLE STORAGE MEDIUM

RELATED APPLICATIONS

This application is a continuation of PCT Application No. PCT/CN2022/123992, filed on Oct. 9, 2022, which claims priority to Chinese Patent Application No. 2021115098892, entitled "GAME MANAGEMENT METHOD, AND APPARATUS, DEVICE AND COMPUTER-READABLE STORAGE MEDIUM" filed with the China National Intellectual Property Administration on Dec. 10, 2021. The two applications are both incorporated herein by reference in their entirety.

FIELD OF THE TECHNOLOGY

Embodiments of this application relate to the field of network technologies, and in particular, to a game management method and, an apparatus, a device and a computer-readable storage medium.

BACKGROUND OF THE DISCLOSURE

With the rapid development of network technologies, online games applied by multiple players online, such as multiplayer online battle arena (MOBA) Games, are favored by more and more users.

Often, when a game is managed, there is a reward mechanism within a specified time of a season. A user will be rewarded with a fixed quantity of resources, such as an experience value, for playing the game within the specified time.

However, users of different game levels often obtain the same quantity of resources from playing the game. As a result, the degree of matching between the determined quantity of the resources and the users is low, and game management is not flexible.

SUMMARY

Provided in embodiments of this application are a game management method, and apparatus, a device and a computer-readable storage medium. The technical solutions are as follows:

One aspect of this application provides a game management method, the method being performed by a terminal device and including displaying a game interface of a target game, the game interface displaying a first content in response to that a runtime of the target game is in a first time period and the target game is in a ranking game mode, the first content indicating a base number of times to accelerate the acquisition of first resources that can be applied in the first time period; and displaying a second content in response to receiving a selection instruction for the first content, the second content comprising a first additional quantity of the first resources acquirable by playing one of the base number of times in the first time period, the first additional quantity being determined based on a current game level of a user and used for changing a game level of the user. In some embodiments, the accelerating the acquisition of first resources refers to that, in addition to acquiring the first resources by participating in the target game, the first resources are acquirable when participating in the target game in the first time period.

Another aspect of this application provides an electronic device, including one or more processors and a memory, the memory storing at least one computer-readable instruction, the at least one computer-readable instruction being loaded and executed by the one or more processors, to cause the electronic device to implement the game management method according to any one of the foregoing method embodiments.

Another aspect of this application provides a non-transitory computer-readable storage medium. The computer-readable storage medium stores at least one computer-readable instruction, and the at least one computer-readable instruction is loaded and executed by one or more processors, to cause a computer to implement the game management method according to any one of the foregoing method embodiments.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 1 is a schematic diagram of an implementation environment of a game management method provided by an embodiment of this application.

FIG. 2 is a flowchart of a game management method provided by an embodiment of this application.

DESCRIPTION OF EMBODIMENTS

Figure 3:
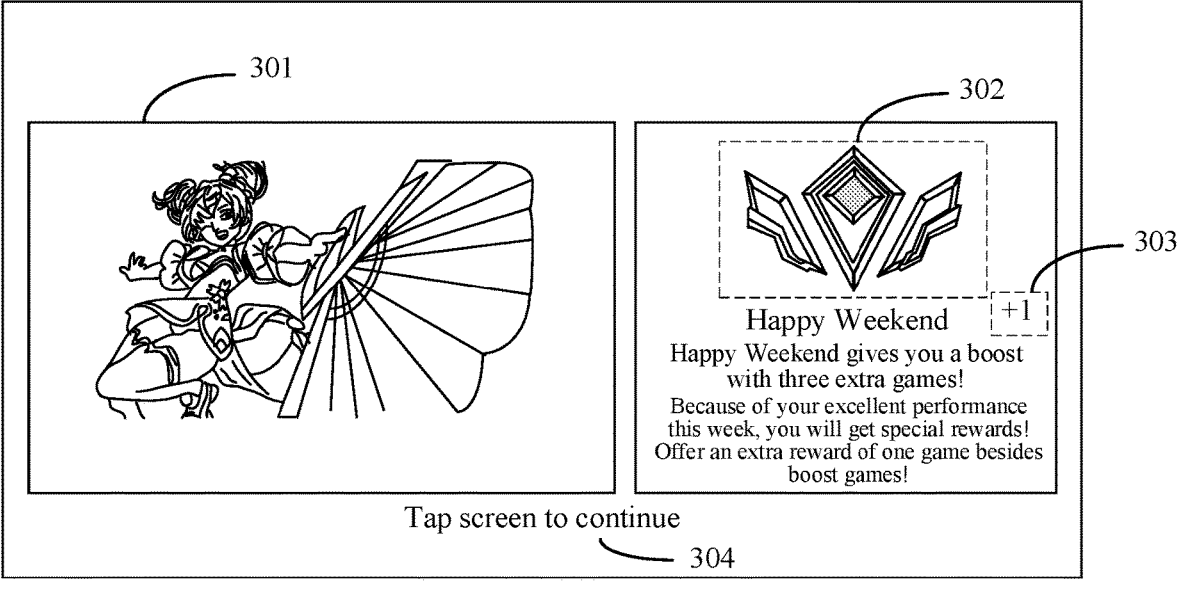
FIG. 3 is a schematic diagram showing a game interface provided by an embodiment of this application.

To make objectives, technical solutions, and advantages of this application clearer, the following further describes implementations of this application in detail with reference to accompanying drawings.

Several terms used in describing some embodiments of this application are first explained as follows.

Virtual Scene: it refers to a scene provided (or disapplied) by an application when the application runs on a terminal device. The virtual scene refers to a scene created for a virtual object to move. The virtual scene may be a two-dimensional virtual scene, a 2.5-dimensional virtual scene, a three-dimensional virtual scene, or the like. The virtual scene may be a simulation of the real world, a semi-simulation and a semi-fiction of the real world, or a fiction world. As an example, in some embodiments, the virtual scene is a three-dimensional virtual scene.

Virtual Object: it refers to a movable object in the virtual scene. The movable object may be a virtual character, virtual animal, cartoon character, or the like. An interaction object may manipulate a virtual object through a peripheral component or by tapping a touch screen. Each virtual object has its own shape and volume in the virtual scene, and occupies part of controls in the virtual scene. As an example, in response to that the virtual scene is a three-dimensional virtual scene, the virtual object is a three-dimensional model created based on an animation skeleton technology.

Multiplayer online battle arena (MOBA) game: it refers to a game type in which players may select their own roles they are good at from various types of roles, engage in battles between two opposing teams (usually 5V5), and the condition of victory being to break through defense lines and destroy enemy guarded buildings.

Ranking Game: it refers to a game mode in the MOBA game, through which the players may play to obtain a rank honor certificate, which is usually a main growth pursuit goal of the players in the MOBA game.

Rankings in Ranking game: it may be improved by playing the ranking games and is a manifestation of players' individual game abilities, and climbing of the ranks will bring the players a sense of achievement, otherwise it will bring the players a sense of frustration.

Season Journey: it refers to a set of system modules specifically attached to the ranking game mode, and the main purpose of the season journey is to help the players reduce the sense of frustration caused by ranking decline and to increase the degree of participation of the players in the ranking game mode by adding a growth pursuit goal in the ranked mode.

Journey Value: it refers to an item that improves the growth level of the season journey, and is obtained by playing in the ranking game mode.

Ranked Coin refers to a special reward item in the season journey, and may purchase a specific item in the ranked store.

Happy Weekend: it refers to a time-limited activity regularly launched for the season journey, and the players may obtain additional journey values and ranked coins by participating in this activity. The additional rewards are used for improving the enthusiasm of the players in participating in this activity, and the players' fixed habits are developed through time fixing and time limiting.

FIG. 1 is a schematic diagram of an implementation environment of a game management method provided by an embodiment of this application. As shown in FIG. 1, the implementation environment includes: a terminal device 101 and a server 102.

An application capable of providing a virtual scene is installed and run in terminal device 101. The terminal device 101 is configured to perform the game management method provided in this embodiment of this application.

The types of the application capable of providing the virtual scene are not limited in this embodiment of this application. As an example, the application capable of providing the virtual scene refers to a game application, such as a third-person shooting (TPS) game, a first-person shooting (FPS) game, a multiplayer online battle arena (MOBA) game, and a multiplayer gunbattle survival game. In one embodiment, the game application involved in this embodiment of this application is based on frame synchronization.

That is, the game management method provided in this embodiment of this application may be applied to the game application based on frame synchronization.

In addition to the game application, the application capable of providing a virtual scene may further be other types of applications, such as a virtual reality (VR) application, an augmented reality (AR) application, a three-dimensional map application, a military simulation application, a social application, and an interactive entertainment application.

The server 102 is configured to provide a background service for the application capable of providing the virtual scene installed in the terminal device 101. In one embodiment, the server 102 is responsible for primary computing work, and the terminal device 101 is responsible for secondary computing work; or, the server 102 is responsible for the secondary computing work, and the terminal device 101 is responsible for the primary computing work; or, the terminal device 101 and the server 102 perform cooperative computing therebetween by using a distributed computing architecture.

In one embodiment, the terminal device 101 is any electronic device product that may perform human-computer interaction with users through one or more ways, such as a keyboard, a touch pad, a touch screen, a remote control, voice interaction or a handwriting device. For example, the electronic device product is a personal computer (PC), a mobile phone, a smartphone, a personal digital assistant (PDA), a wearable device, a pocket PC (PPC), a tablet computer, a smart vehicle-mounted terminal, a smart television, a smart speaker, etc. The server 102 may be a server, a server cluster including a plurality of servers, or a cloud computing service center. A communication connection is established between the terminal device 101 and the server 102 through a wired network or a wireless network.

It is to be understood by a person skilled in the art that, the terminal device 101 and server 102 above are illustrative only, and that other existing or possible future terminal devices or servers, if applicable to this application, may also fall within the protection scope of this application, and are hereby incorporated herein by reference.

Based on the above implementation environment shown in FIG. 1, provided in an embodiment of this application is a game management method. Using a flowchart of a game management method provided by an embodiment of this application as shown in FIG. 2 as an example, the method may be performed by terminal device 101 in FIG. 1. As shown in FIG. 2, the method provided in this embodiment of this application includes the following steps:

In step 201, a game interface of a target game is disapplied, the game interface having a first content disapplied thereon in response to that a runtime of the target game is in a first time period and the target game is in a ranking game mode, the first content being used for indicating a base number of times to accelerate the acquisition of first resources that can be applied in the first time period, the accelerating the acquisition of first resources referring to that, based on acquiring the first resources by participating in the target game, the first resources are additionally acquirable when participating in the target game in the first time period.

In one embodiment of this application, a target game capable of providing a virtual scene is installed and runs in the terminal device, and the target game may be any type of game, which is not limited in this embodiment of this application. As an example, in this embodiment of this application, the target game is a MOBA game.

A plurality of applications are disapplied on a display interface of the terminal device, and the types of each application may be the same or different, which is also not limited in this embodiment of this application. In response to selecting the target game in the plurality of disapplied applications by a user, the terminal device receives a selection instruction for the target game, and runs the target game. The target game includes a plurality of game modes, such as a normal matching mode and a ranking game mode. In response to that the runtime of the target game is in the first time period and the target game is in the ranking game mode, a number of games applied by the user in a third time period is determined. In response to the fact that the number of games spent is less than a target number of times, the game interface of the target game is disapplied, and the game interface has the first content disapplied thereon. In this way, by setting that the first content is disapplied on the game interface in the case that the number of games spent is less than the target number of times, display resources of a system may be saved.

The first time period is set by a developer of the target game, and a duration of the first time period is also determined by the developer of the target game. As an example, the duration of the first time period is 48 hours, and the first time period ranges from 00:00 on Saturday to 24:00 on Sunday of every week. The start time of the third time period is consistent with a start time of the first time period, and an end time of the third time period is the runtime. The target number of times is determined based on the base number of times to accelerate the acquisition of first resources that can be applied by the user in the first time period and the additional number of times to accelerate the acquisition of first resources that can be applied by the user in the first time period.

As an example, if the user runs the target game at 10:00 on Saturday, the runtime is 10:00 on Saturday, and the third time period ranges from 00:00 on Saturday to 10:00 on Saturday.

In one embodiment, the target number of times is a sum value of the base number of times to accelerate the acquisition of first resources that can be applied by the user in the first time period and the additional number of times to accelerate the acquisition of first resources that can be applied by the user in the first time period.

As an example, if the base number of times to accelerate the acquisition of first resources that can be applied by the user in the first time period is three, and the additional number of times to accelerate the acquisition of first resources that can be applied by the user in the first time period is two, then the target number of times is five.

In one embodiment, in response to that there is still a number of games to accelerate the acquisition of first resources remained by the user in the previous first time period, the number of games to accelerate the acquisition of first resources remained by the user in the previous first time period further needs to be considered when determining the target number. That is, the target number of times is a sum value of the base number of times to accelerate the acquisition of first resources that can be applied by the user in the first time period, the additional number of times to accelerate the acquisition of first resources that can be applied by the user in the first time period and the number of games to accelerate the acquisition of first resources remained by the user in the previous first time period.

As an example, if the base number of times to accelerate the acquisition of first resources that can be applied by the user in the first time period is three, the additional number of times to accelerate the acquisition of first resources that can be applied by the user in the first time period is two, and the number of games to accelerate the acquisition of first resources remained by the user in the previous first time period is one, then the target number of times is six.

As shown in FIG. 3, it is a schematic diagram showing a game interface provided by an embodiment of this application. In FIG. 3, "Happy Weekend gives you a boost with three extra games!" serves as the first content. Three is the base number of times to accelerate the acquisition of first resources that can be applied by the user in the first time period. That is, the user may acquire the first resources for three additional times when participating in the target game in the first time period.

The base number of times to accelerate the acquisition of first resources that can be applied by the user in the first time period may be a fixed value. That is, regardless of the current game level of the user, the base number of times to accelerate the acquisition of first resources that can be applied by the user in the first time period is the same. For example, in response to that the current game level of the user is Gold, the base number of times to accelerate the acquisition of first resources that can be applied by the user in the first time period is three. In response to that the current game level of the user is Challenger, the base number of times to accelerate the acquisition of first resources that can be applied by the user in the first time period is still three.

In one embodiment, the base number of times to accelerate the acquisition of first resources that can be applied by the user in the first time period may be determined based on performance of the user in the previous game period (e.g., the previous season journey). That is, period points of the user in the previous game period are acquired, and based on which, the base number of times to accelerate the acquisition of first resources that can be applied by the user in the first time period within the present game period is determined. As an example, the period points of the user in the previous game period are in direct proportion to the base number of times to accelerate the acquisition of first resources that can be applied by the user in the first time period within the present game period. That is, the higher the period points of the user in the previous game period, the more the base number of times to accelerate the acquisition of first resources that can be applied by the user in the first time period within the present game period.

In one embodiment, the base number of times to accelerate the acquisition of first resources that can be applied by the user in the first time period may further be determined based on the current game level of the user. For example, the base number of times to accelerate the acquisition of first resources that can be applied by the user in the first time period is in direct proportion to the current game level of the user. That is, the higher the current game level of the user, the more the base number of times to accelerate the acquisition of first resources that can be applied by the user in the first time; otherwise, the lower the current game level of the user, the less the base number of times to accelerate the acquisition of first resources that can be applied by the user in the first time. The base number of times to accelerate the acquisition of first resources that can be applied by the user in the first time period may further be in inverse proportion to the current game level of the user, which is not limited in this embodiment of this application.

As shown in Table 1 below, it is a table showing the correspondence between the current game level and the base number of times to accelerate the acquisition of first resources that can be applied in the first time provided in this embodiment of this application.

TABLE 1

| Current game level | Base number of times to accelerate the acquisition of first resources that can be applied in first time |
|---|---|
| Gold | 1 |
| Platinum | 2 |
| Emerald | 3 |
| Diamond | 4 |
| Master | 5 |
| Grandmaster | 6 |
| Challenger | 7 |

In Table 1 above, in response to that the current game level of the user is Gold, the base number of times to accelerate the acquisition of first resources that can be applied by the user in the first time period is one. In response to that the current game level of the user is Platinum, the base number of times to accelerate the acquisition of first resources that can be applied by the user in the first time period is two. In response to that the current game level of the user is others, the base number of times to accelerate the acquisition of first resources that can be applied by the user in the first time period is shown in Table 1 above.

Table 1 above is only an example of the correspondence between the current game level and the base number of times to accelerate the acquisition of first resources that can be applied in the first time provided in this embodiment of this application, and does not limit it.

In one embodiment, a third content may further be displayed, and the third content is used for indicating the additional number of times to accelerate the acquisition of first resources that can be applied in the first time period. The additional number of times is determined based on game behavior data in a second time period, and the second time period is earlier than the first time period. The second time period is set by the developer of the target game, and the duration of the second time period is also determined by the developer of the target game. As an example, the second time period ranges from 00:00 on Monday to 24:00 on Friday of every week. By displaying the third content in the game interface, it may be convenient for the user to quickly understand the additional number of times to accelerate the acquisition of first resources that can be applied in the first time period, thus improving interaction efficiency.

The third content and the first content may be disapplied on the same page or on two pages, which is not limited to this embodiment of this application. In response to that the third content and the first content are disapplied on the same page, the third content and the first content may be simultaneously disapplied; or the first content may be disapplied first, and then the third content is disapplied after receiving a user's selection instruction for the first content; or the third content may be disapplied first, and then the first content is disapplied after receiving the user's selection instruction for the third content. The display order of the first content and the third content is not limited to this embodiment of this application. This embodiment of this application only uses the case that the first content and the third content are simultaneously disapplied on the same page as an example for description.

"Because of your excellent performance this week, you got special rewards! Offer an extra reward of one game besides boost games!" in the game interface as shown in FIG. 3 serves as the third content. One is the additional number of times to accelerate the acquisition of first resources that can be applied by the user in the first time period. That is, based on the base number of times, the user may acquire the first resources for one additional time when participating in the target game in the first time period.

In one embodiment, the game interface shown in FIG. 3 may further display a first control 301, a second control 302, a third control 303 and a fourth control 304. The first control 301 is configured to display an object image of a virtual object included in the target game. The second control 302 is configured to display a logo image of an activity (e.g., Happy Weekend) held in the target game. The third control 303 is configured to display the additional number of times to accelerate the acquisition of first resources that can be applied by the user in the first time period. The fourth control 304 is configured to display a prompt message. In response to that the additional number of times to accelerate the acquisition of first resources that can be applied by the user in the first time period is 0, the third control is not disapplied. The game interface shown in FIG. 3 may further display other controls, which are not limited in this embodiment of this application.

In one embodiment, before displaying the third content, it is further necessary to determine the additional number of times to accelerate the acquisition of first resources that can be applied by the user in the first time period. The process in which the terminal device determines the additional number of times to accelerate the acquisition of first resources that can be applied by the user in the first time period includes, but is not limited to, the following two:

Determination method 1: game behavior data of the user in the second time period is acquired by the terminal device; game points of the user in the second time period are determined based on the game behavior data of the user in the second time period; and the additional number of times to accelerate the acquisition of first resources that can be applied by the user in the first time period is determined based on the game points of the user in the second time period. By determining the game points of the user in the second time period based on the game behavior data of the user in the second time period, accuracy of the game points may be improved. Accordingly, by determining the additional number of times to accelerate the acquisition of first resources that can be applied by the user in the first time period based on the more accurate game points of the user in the second time period, accuracy of the additional number of times to accelerate the acquisition of first resources may be improved, thereby further improving flexibility of game management.

In one embodiment, the method of acquiring the game behavior data of the user in the second time period includes, but is not limited to, the following two: First method: the terminal device sends an acquisition request to the server, the acquisition request carries a user identification of the user and the second time period, and used for acquiring the game behavior data of the user in the second time period; the server stores the game behavior data of each user in each time period; after receiving the acquisition request, the server parses the acquisition request to obtain the user identification of the user and the second time period; based on the user identification of the user, all the game behavior data of the user is acquired; then, the game behavior data of the user in the second time period is acquired from all the game behavior data of the user; and the server sends the game behavior data of the user in the second time period to the terminal device, and the terminal device thereby acquires the game behavior data of the user in the second time period.

Second method: the terminal device stores the game behavior data of the user in each time period; and the terminal device acquires the game behavior data of the user in the second time period from its own storage space.

The game behavior data includes at least one game victory, game defeat, game level promotion and the number of days logged into a game. The game behavior data may further include others, which is not limited in this embodiment of this application. As an example, if the user logged into the game every day from Monday to Wednesday of Monday to Friday, then the number of days the user logged into the game during Monday to Friday is three.

The process of determining the game points of the user in the second time period based on the game behavior data of the user in the second time period includes: acquiring point parameters respectively corresponding to various game behavior data; and determining the game points of the user in the second time period based on number of behaviors respectively corresponding to various game behavior data of the user in the second time period and the point parameters respectively corresponding to various game behavior data. By comprehensively considering the number of behaviors respectively corresponding to various game behavior data of the user in the second time period and the point parameters respectively corresponding to various game behavior data, the accuracy of the game points may be improved.

As shown in Table 2 below, it is a table showing the correspondence between the game behavior data and the point parameters provided in this embodiment of this application.

TABLE 2

| Game behavior data | Point parameters |
| --- | --- |
| Game victory | +5 |
| Game defeat | +15 |
| Game level promotion | −30 |
| Number of days logged into game | +10 |

As can be seen from Table 2 above, in response to that the game behavior data is game victory, the corresponding point parameter is +5. In response to that the game behavior data is game defeat, the corresponding point parameter is +15. The point parameter corresponding to game defeat is higher than the point parameter corresponding to game victory in order to appease a user who is defeated in the game. In response to that the game behavior data is game level promotion, the corresponding point parameter is −30. Since the sense of achievement brought by game level promotion has far exceeded the user's sense of growth, no more points will be encouraged here for the user, to avoid the user from having a higher sense of frustration at a later stage. In response to that the game behavior data is the number of days logged into the game, the corresponding point parameter is +10.

Table 2 above is only an example of the correspondence between the game behavior data and the point parameters provided in this embodiment of this application, and does not limit it.

Based on the number of behaviors respectively corresponding to various game behavior data of the user in the second time period and the point parameters respectively corresponding to various game behavior data, the game points S of the user in the second time period are determined according to the following Formula (1).

$$S=A*\alpha+B*\beta+C*\gamma+D*\theta \qquad (1)$$

In Formula (1) above, A is a number of times of game victories of the user in the second time period, and $\alpha$ is a point parameter corresponding to game victory; B is a number of times of game defeats of the user in the second time period, and $\beta$ is a point parameter corresponding to game defeat; C is a number of times of game level promotions of the user in the second time period, and $\gamma$ is a point parameter corresponding to game level promotion; and D is a number of days logged into the game of the user in the second time period, and $\theta$ is a point parameter corresponding to the number of days logged into the game.

As an example, the number of game victories of the user in the second time period is ten, the number of game defeats is three, the number of game level promotions is one, and the number of days logged into the game is five. Based on Table 2 above and Formula (1) above, the game points of the user in the second time period are determined as:

$$S=10*5+3*15+1*(-30)+5*10=115.$$

Determination method 2: the terminal device sends a point acquisition request to the server, the point acquisition request carries a user identification of the user, and used for acquiring the game points of the user in the second time period; and the game points of the user in the second time period returned from the server are received.

The process in which after receiving the point acquisition request, the server acquires the game points of the user in the second time period based on the point acquisition request includes: parsing, by the server, the point acquisition request to obtain the user identification of the user; acquiring the game behavior data of the user in the second time period based on the user identification of the user; and determining the game points of the user in the second time period based on number of behaviors respectively corresponding to various game behavior data of the user in the second time period and the point parameters respectively corresponding to various game behavior data.

After determining the game points of the user in the second time period, the server sends the game points of the user in the second time period to the terminal device, such that the terminal device acquires the game points of the user in the second time period.

The game points of the user in the second time period may be determined through any one of the above determination methods or through other methods, which is not limited in this embodiment of this application.

In one embodiment, the process in which after determining the game points of the user in the second time period, the additional number of times to accelerate the acquisition of first resources that can be applied by the user in the first time period is determined based on the game points of the user in the second time period includes: determining a target point interval where the game points of the user in the second time period are located; using, based on pre-stored correspondence between point intervals and number of times, a number of times corresponding to the target point interval as the additional number of times to accelerate the acquisition of first resources that can be applied by the user in the first time period; and determining the additional number of times to accelerate the acquisition of first resources that can be applied by the user in the first time period based on the pre-stored correspondence between the point intervals and the number of times, which may improve computing efficiency of the additional number of times to accelerate the acquisition of first resource.

The terminal device stores the correspondence between the point intervals and the number of times. Based on the game points of the user in the second time period, the terminal device determines the target point interval where the game points of the user in the second time period are located, and then uses the number of times corresponding to the target point interval as the additional number of times to accelerate the acquisition of first resources that can be applied by the user in the first time period. Since the additional number of times to accelerate the acquisition of first resources that can be applied by the user in the first time period is determined based on the game behavior data of the user in the second time period, determination of the additional number of times to accelerate the acquisition of first resources that can be applied in the first time period is relatively flexible and fairer. Since a positive encouragement is performed on the game behavior data of the user in the second time period, the user may have more times to additionally acquire the first resources in the first time period, which in turn forms a positive feedback loop. Moreover, the game behavior data of the user in the second time period will be converted into the additional number of times to accelerate the acquisition of first resources that can be applied in the first time period, and in order to have more additional times to acquire a greater number of first resources, the user will select to generate more game behavior data in the second time period, so as to arouse the user's enthusiasm to play the game.

As an example, as shown in Table 3 below, it is a table showing the correspondence between the point intervals and the number of times provided in this embodiment of this application.

TABLE 3

| Point interval | number of times |
| --- | --- |
| (0,100) | 0 |
| [100,200) | 1 |
| [200,300) | 2 |
| [300,+∞) | 3 |

As can be seen from Table 3 above, in response to that the point interval is (0,100), the corresponding number of times is 0; In response to that the point interval is [100,200), the corresponding number of times is one. In response to that the point interval is others, the corresponding number of times is shown in Table 3 above.

Table 3 above is only an example of the correspondence between the point intervals and the number of times provided in this embodiment of this application, and does not limit it.

As an example, the user obtains 115 game points in the second time period, the target point interval is determined as [100,200) based on Table 3 above. Thus, the number of times corresponding to the target point interval [100,200) is used as the additional number of times to accelerate the acquisition of first resources that can be applied by the user in the first time period. That is, the additional number of times to accelerate the acquisition of first resources that can be applied by the user in the first time period is one.

After determining the game points of the user in the second time period, it is further necessary to determine the third content based on the game points of the user in the second time period. The process includes: acquiring a plurality of candidate contents, each candidate content corresponding to a point interval; determining contents-to-be-selected among the plurality of candidate contents based on the game points of the user in the second time period, the game points of the user in the second time period being located in a point interval corresponding to the contents-to-be-selected; and determining the third content among the contents-to-be-selected. By determining the content-to-be-selected among the plurality of candidate contents based on the game points of the user in the second time period, accuracy of the content-to-be-selected may be improved, and thus the flexibility of game management may be further improved.

In one embodiment, the method of determining the third content in contents-to-be-selected includes, but is not limited to, the following five.

Method 1, one of the contents-to-be-selected is randomly determined and used as the third content.

Method 2, each content-to-be-selected corresponds to a relationship between a number of victories and a number of defeats, and the relationship between a number of victories and a number of defeats is a magnitude relationship between a number of victories and a number of defeats; a relationship between a number of victories and a number of defeats of the user in the second time period is determined; a target content-to-be-selected is determined from the contents-to-be-selected and used as the third content; and a relationship between a number of victories and a number of defeats corresponding to the target content-to-be-selected is consistent with the relationship between a number of victories and a number of defeats of the user in the second time period. By judging whether the relationship between a number of victories and a number of defeats corresponding to the content-to-be-selected is consistent with the relationship between a number of victories and a number of defeats of the user in the second time period, the third content may be quickly and accurately determined from the contents-to-be-selected, improving display efficiency of the third content.

The terminal device stores the correspondence between the point intervals, the relationship between a number of victories and a number of defeats and the candidate contents. The target point interval where the game points of the user in the second time period are located is determined. The candidate content corresponding to the target point interval is used as the content-to-be-selected. The relationship between a number of victories and a number of defeats of the user in the second time period is thus determined. The content-to-be-selected in which the relationship between a number of victories and a number of defeats is consistent with the relationship between a number of victories and a number of defeats of the user in the second time period among the contents-to-be-selected is used as the third content.

As shown in Table 4 below, it is a table showing the correspondence between the point intervals, the relationship between a number of victories and a number of defeats and the candidate contents provided in this embodiment of this application.

TABLE 4

| | Candidate content | | |
| --- | --- | --- | --- |
| Point interval | number of victories > number of defeats | number of victories < number of defeats | number of victories = number of defeats |
| (0,100) | | None | |
| [100,200) | Because of your excellent performance this week, you will get special rewards! Offer an extra reward of one game besides boost games! | The climbing way is long, you get special rewards, fighting! Offer an extra reward of one game besides boost games! | Winning or losing doesn't matter, it's the reward that matters, so keep on fighting! Offer an extra reward of one game besides boost games! |
| [200,300) | Because of your excellent performance this week, you will get special rewards! Offer extra rewards of two games besides boost games! | The climbing way is long, you get special rewards, fighting! Offer extra rewards of two games besides boost games! | Winning or losing doesn't matter, it's the reward that matters, so keep on fighting! Offer extra rewards of two games besides boost games! |
| [300,+∞) | Because of your outstanding performance this week, you will get special rewards! Offer extra rewards of three games besides boost games! | Don't be discouraged by even more difficulty in the climbing way, fighting! Offer extra rewards of three games besides boost games! | Winning or losing doesn't matter, it's the reward that matters, so keep on fighting! Offer extra rewards of three games besides boost games! |

As can be seen from Table 4 above, in response to that the point interval is [100,200) and the victory number of times is greater than the defeat number of times, the corresponding candidate content is "Because of your excellent performance this week, you get special rewards! Offer an extra reward of one game besides boost games!". In response to that the point interval is others and the relationship between a number of victories and a number of defeats is others, the corresponding candidate content is shown in Table 4 above for details.

As an example, the user obtains 115 game points in the second time period, that is, the game points of the user in the second time period are located in the point interval [100, 200), and thus it is determined among the plurality of candidate contents that the three candidate contents corresponding to the point interval [100,200) are the contents-to-be-selected. Since the number of game victories of the user in the second time period is ten and the number of game defeats is three, it is determined that the number of game victories of the user in the second time period is greater than the number of game defeats. Then, the content-to-be-selected that corresponds to the case of the number of game victories being greater than the number of game defeats among the three contents-to-be-selected is used as the third content. That is, the third content is "Because of your excellent performance this week, you get special rewards! Offer an extra reward of one game besides boost games!".

Method 3, each content-to-be-selected corresponds to a number of game level promotions; the number of game level promotions of the user in the second time period is determined; and the content-to-be-selected in which the number of game level promotions is consistent with the number of game level promotions of the user in the second time period among the contents-to-be-selected is used as the third content.

The terminal device stores the correspondence between the point intervals, the number of game level promotions and the candidate contents. The target point interval where the game points of the user in the second time period are located is determined. The candidate content corresponding to the target point interval is used as the content-to-be-selected. The number of game level promotions of the user in the second time period is thus determined. The content-to-beselected in which the number of game level promotions is consistent with the number of game level promotions of the user in the second time period among the contents-to-be-selected is used as the third content.

As an example, the target point interval where the game points of the user in the second time period are located is determined as [100,200), and candidate content 1, candidate content 2 and candidate content 3 corresponding to the target point interval [100,200) are used as the candidate contents. The number of game level promotions of the user in the second time period is determined as two. The number of game level promotions corresponding to candidate content 1 is one, the number of game level promotions corresponding to candidate content 2 is two, and the number of game level promotions corresponding to candidate content 3 is three. Since the number of game level promotions corresponding to candidate content 2 is consistent with the number of game level promotions of the user in the second time period, candidate content 2 is used as the third content.

Method 4, each content-to-be-selected corresponds to a number of days logged into the game; the number of days logged into the game of the user in the second time period is determined; and the content-to-be-selected in which a number of days logged into the game is consistent with the number of days logged into the game of the user in the second time period among the contents-to-be-selected is used as the third content.

The terminal device stores the correspondence between the point intervals, the number of days logged into the game and the candidate contents. The target point interval where the game points of the user in the second time period are located is determined. The candidate content corresponding to the target point interval is used as the content-to-be-selected. The number of days logged into the game of the user in the second time period is thus determined. The content-to-be-selected in which a number of days logged into the game is consistent with the number of days logged into the game of the user in the second time period among the contents-to-be-selected is used as the third content.

As an example, the target point interval where the game points of the user in the second time period are located is determined as [100,200), and candidate content 1, candidate content 2 and candidate content 3 corresponding to the target point interval [100,200) are used as the candidate contents. The number of days logged into the game of the user in the second time period is determined as three. The number of days logged into the game corresponding to candidate content 1 is one, the number of days logged into the game corresponding to candidate content 2 is two, and the number of days logged into the game corresponding to candidate content 3 is three. Since the number of days logged into the game corresponding to candidate content 3 is consistent with the number of days logged into the game of the user in the second time period, candidate content 3 is used as the third content.

Method 5, the terminal device receives the third content sent by the server.

The terminal device sends a content acquisition request to the server, the content acquisition request carries a user identification of the user, and used for acquiring the third content. After receiving the content acquisition request, the server parses the content acquisition request to obtain the user identification of the user, and thus acquire the third content based on the user identification of the user. The process of acquiring the third content by the server is similar to the process of acquiring the third content by the terminal device as described in Method 1 to Method 4, which will not be described again. The server sends the acquired third content to the terminal device, and the terminal device thereby acquires the third content.

Figure 4:
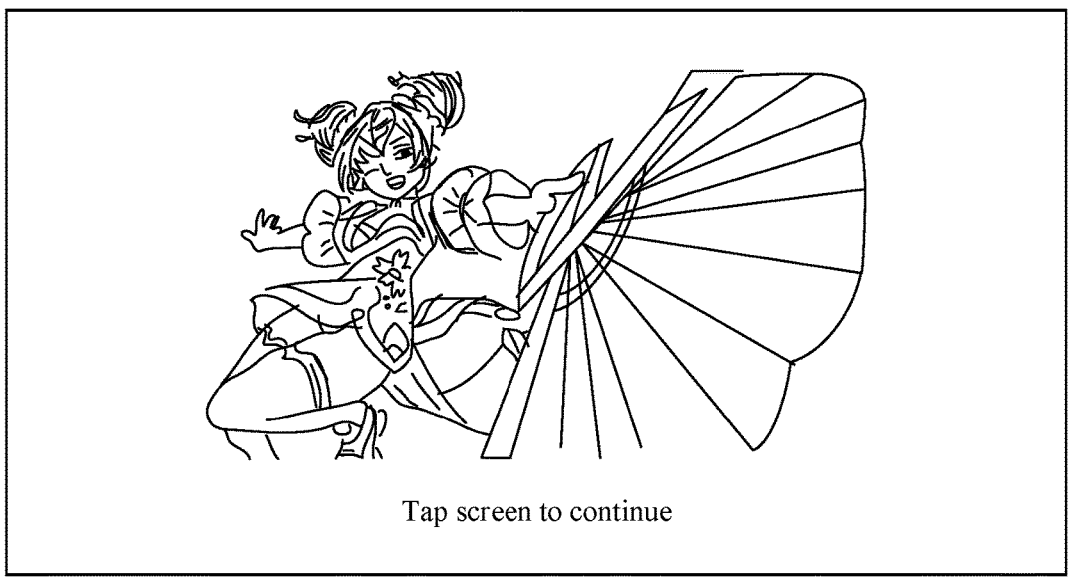
FIG. 4 is a schematic diagram showing another game interface provided by an embodiment of this application.

In one embodiment, in response to that the runtime of the target game is not in the first time period, or the runtime of the target game is in the first time and the target game is not in the ranking game mode, or the runtime of the target game is in the first time period and the target game is in the ranking game mode, and the number of games to accelerate the acquisition of first resources applied by the user in the third time period is not less than the target number of times, the game interface does not have the first content and the third content disapplied thereon. As shown in FIG. 4, it is a schematic diagram showing another game interface provided by an embodiment of this application. Neither the first content nor the third content is disapplied in the game interface shown in FIG. 4. The object image of the virtual object included in the target game is disapplied in the game interface shown in FIG. 4.

In step 202, a second content is disapplied in response to receiving a selection instruction for the first content, the second content including a first additional quantity of the first resources that are additionally acquirable by spending one of the base number of times in the first time period, the first additional quantity being determined based on the current game level of the user and used for changing the game level of the user.

In one embodiment, a first page is disapplied in response to receiving the selection instruction for the first content, the first page displaying at least one of time information and number of times information, where the time information is used for indicating a that can be applied time of a remaining number of times to accelerate the acquisition of first resources and determined based on a current time and the end time of the first time period, and the number of times information includes a target number of times to accelerate the acquisition of first resources that can be applied in the first time period and the remaining number of times to accelerate the acquisition of first resources that can be applied in the that can be applied time. The remaining number of times is a difference value between the target number of times to accelerate the acquisition of first resources that can be applied in the first time period and the number of games to accelerate the acquisition of first resources spent in the first time period. In response to receiving a selection instruction for the first page, the second content is disapplied. By displaying at least one of the time information and the number of times information, richness of information display may be improved. By triggering to display the second content in the first page, display flexibility and interaction richness may be further improved.

Figure 5:
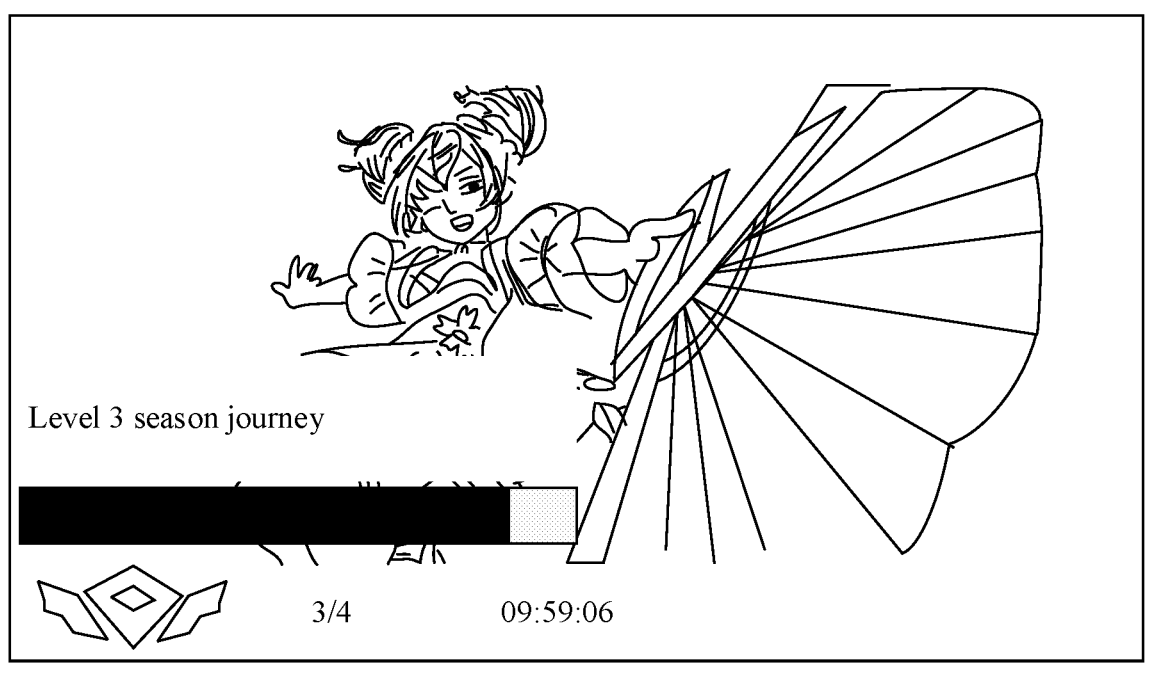
FIG. 5 is a schematic diagram showing a first page provided by an embodiment of this application.

As shown in FIG. 5, it is a schematic diagram showing a first page provided by an embodiment of this application. ¾ disapplied in FIG. 5 is used for representing that the target number of times to accelerate the acquisition of first resources that can be applied in the first time period is four, and the remaining number of times to accelerate the acquisition of first resources that can be applied in the that can be applied time is three. 09:59:06 is used for representing that the that can be applied time of the remaining number of times to accelerate the acquisition of first resources is 9 hours, 59 minutes, and 6 seconds.

The game level of the user may further be disapplied in the first page, e.g., "Level 3" disapplied in FIG. 5. The game level of the user is determined based on the quantity of the first resources already acquired by the user. By displaying the game level of the user on the first page, it may be convenient for the user to quickly understand his current game level, thus improving the interaction efficiency.

In one embodiment, the second content includes the first additional quantity of the first resources that are additionally acquirable by spending one of the base number of times in the first time period, and the first additional quantity is determined based on the current game level of the user and used for changing the game level of the user. As an example, the first resources are journey values. The user may additionally acquire the first resources of the first additional quantity by spending one of the base number of times in the first time period, which may promote the user to develop a good game habit and enable the user to participate in the game on time in the first time period, thus enabling the user to obtain more first resources, and further accelerating the promotion of user's game level, thus making the efficiency of game management relatively high.

As shown in Table 5 below, it is a table showing the correspondence between the game level and the first additional quantity provided in this embodiment of this application.

TABLE 5

| Game level | First additional quantity |
|---|---|
| Gold | 6 |
| Platinum | 8 |
| Emerald | 10 |
| Diamond | 12 |
| Master | 13 |
| Grandmaster | 14 |
| Challenger | 15 |

As can be seen from Table 5 above, in response to that the game level is Gold, the corresponding first additional quantity is six. That is, in response to that the game level of the user is Gold, the additional quantity of the first resources that are acquirable by spending one of the base number of times by the user in the first time period is six. In response to that the game level is others, the corresponding first additional quantity is shown in Table 5 above.

Table 5 above is only an example of the correspondence between the game level and the first additional quantity provided in this embodiment of this application, and does not limit it.

Since the determined first additional quantity is associated with the game level of the user, that is, the first additional quantity is customized for the user based on the game level of the user, the first additional quantities of the first resources that are acquirable by users of all game levels when participating in the game are matched with effort and time required by each user.

In one embodiment, the second content further includes a second additional quantity of second resources that are additionally acquirable by playing one of the base number of times in the first time period. The second sources are used for acquiring virtual resources. As an example, the second resources are ranked coins. The second additional quantity may be a fixed numerical value. That is, the second additional quantity is associated with the current game level of the user. The second additional quantity may further be determined based on the current game level of the user. In response to that the second additional quantity is the fixed numerical value, the second additional quantity is determined by the developer of the target game, and the developer of the target game may further adjust the second additional quantity, which is not limited in this embodiment of this application. In response to the fact that the second additional quantity is determined based on the current game level of the user, the terminal device stores the correspondence between the game levels and the second additional quantities. The terminal device acquires the current game level of the user. Based on the current game level of the user and the correspondence between the game levels and the second additional quantities, the second additional quantity of the second resources that are additionally acquirable by the user by spending one of the base number of times in the first time period is determined. By displaying the second additional quantity of the second resources that are additionally acquirable by spending one of the base number of times in the first time period, the user may be better motivated to participate in the target game, thus further improving the flexibility of game management.

As an example, in response to that the current game level of the user is Gold and the second additional quantity corresponding to Gold is 20, the additional quantity of the second resources that are additionally acquirable by the user by spending one of the base number of times in the first time period is 20.

In one embodiment, the fourth content may further be disapplied, and includes a first base quantity of the first resources that are acquirable when participating in the target game. The first base quantity may be a fixed numerical value, and may further be determined based on the current game level of the user. In response to that the first base quantity is the fixed numerical value, the first base quantity is determined by the developer of the target game, and the developer of the target game may further adjust the first base quantity, which is not limited in this embodiment of this application. In response to that the first base quantity is determined based on the current game level of the user, the determination process of the first base quantity is similar to the above determination process of the second additional quantity. By displaying the first base quantity of the first resources that are additionally acquirable when participating in the target game, the user may be effectively motivated to participate in the target game, thus further improving the game management efficiency.

As an example, in response to that the current game level of the user is Gold and the first base quantity corresponding to Gold is six, the first base quantity of the first resources that are acquirable by the user when participating in the target game is six.

In one embodiment, the fourth content may further include a second base quantity of the second resources that are acquirable when participating in the target game. The second base quantity may be a fixed numerical value, and may further be determined based on the current game level of the user. In response to that the second base quantity is the fixed numerical value, the second base quantity is determined by the developer of the target game, and the developer of the target game may further adjust the second base quantity, which is not limited in this embodiment of this application. In response to that the second base quantity is determined based on the current game level of the user, the determination process of the second base quantity is similar to the above determination process of the second additional quantity. By displaying the second base quantity of the second resources that are additionally acquirable when participating in the target game, the user may be effectively motivated to participate in the target game, thus further improving the game management efficiency.

As an example, in response to that the current game level of the user is Gold and the second base quantity corresponding to Gold is ten, the second base quantity of the second resources that are acquirable by the user when participating in the target game is ten.

The second content and the fourth content may be disapplied on the same page or on two pages, which is not limited in this embodiment of this application. In response to that the second content and the fourth content are disapplied on the same page, the second content and the fourth content may be simultaneously disapplied; or the second content may be disapplied first, and then the fourth content is disapplied after receiving a user's selection instruction for the second content; or the fourth content may be disapplied first, and then the second content is disapplied after receiving the user's selection instruction for the fourth content. The display order of the second content and the fourth content is not limited to this embodiment of this application. This embodiment of this application only uses the second content and the fourth content simultaneously disapplied on the same page as an example for exemplary description.

Figure 6:
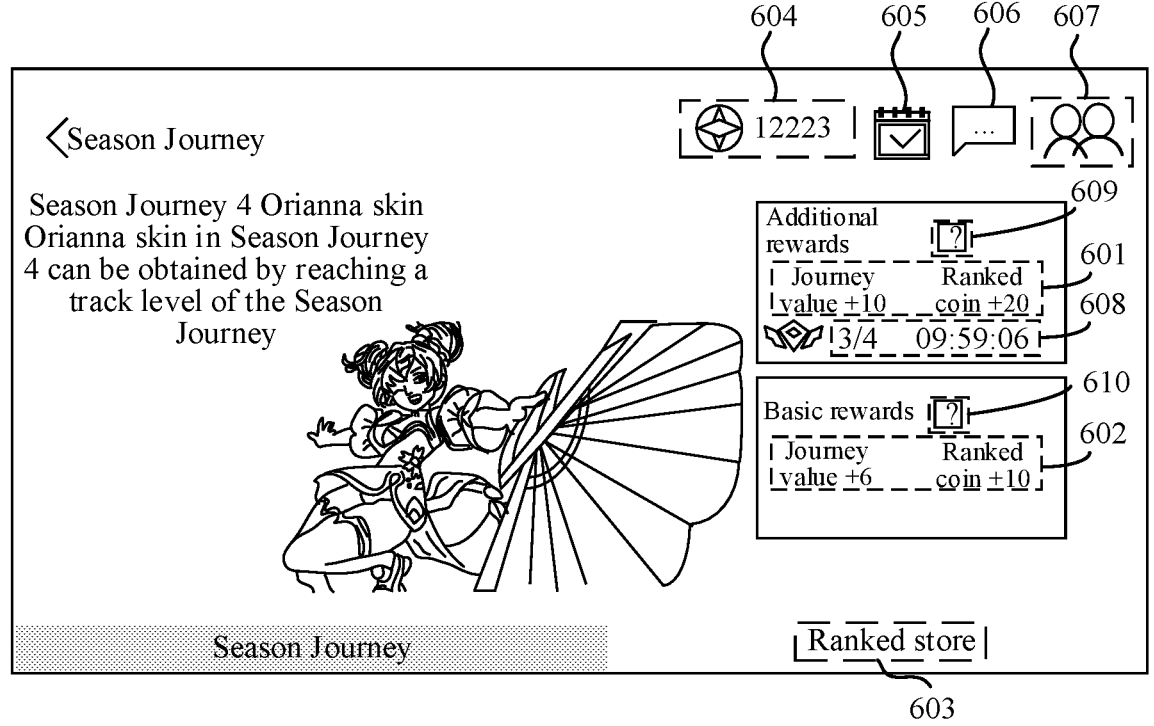
FIG. 6 is a schematic diagram showing a second content provided by an embodiment of this application.

As shown in FIG. 6, it is a schematic diagram showing a second content provided by an embodiment of this application. In FIG. 6, the content disapplied in control 601 serves as the second content, and the content disapplied in a control 602 serves as the fourth content. As can be seen from the contents disapplied by the control 601 and the control 602 shown in FIG. 6, the first additional quantity of the first resources (journey values) that are additionally acquirable by the user by spending one of the base number of times in the first time period is ten, the first base quantity of the first resources (journey values) that are acquirable by the user when participating in the target game is six, the second additional quantity of the second resources (ranked coins) that are additionally acquirable by the user by spending one of the base number of times in the first time period is 20, and the second base quantity of the second resources (ranked coins) that are acquirable by the user when participating in the target game is ten. That is, the quantity of the first resources (journey values) that are acquirable by the user when participating in the target game in the first time period by spending one of the base number of times is 16, and the quantity of the second resources (ranked coins) is 30.

A control 603, a control 604, a control 605, a control 606, a control 607, a control 608, a control 609 and a control 610 are further disapplied in FIG. 6. Control 603 is configured to acquire virtual resources. In response to a user's selection instruction for control 603, at least one of the acquirable virtual resources is disapplied, such that the user acquires the virtual resources by using the acquired second resources. Control 604 is configured to indicate the quantity of the second resources that have been acquired by the user. Control 605 is a date. Control 606 is a message list of the user. Control 607 is a friend list of the user. The control 608 is configured to indicate the target number of times (4) to accelerate the acquisition of first resources that can be applied by the user in the first time period, the remaining number of times (3) to accelerate the acquisition of first resources of the user within the time information, and the that can be applied time (09:59:06) of the remaining number of times. Control 609 is a detailed description of additional rewards. Control 610 is a detailed description of basic rewards.

The user may also additionally acquire the first resources by spending one of the additional number of times in the first time period, and the quantity of the first resources that are additionally acquirable by the user by spending one of the additional number of times in the first time period may be consistent or inconsistent with the first additional quantity of the first resources that are additionally acquirable by the user by spending one of the base number of times in the first time period, which is not limited in this embodiment of this application. The user may also additionally acquire the second resources by spending one of the additional number of times in the first time period, the quantity of the second resources that are additionally acquirable by the user by spending one of the additional number of times in the first time period may be consistent or inconsistent with the second additional quantity of the second resources that are additionally acquirable by the user by spending one of the base number of times in the first time period, which is not limited in this embodiment of this application.

In one embodiment, in response to that the user participates in the target game by spending one of the base number of times in the first time period or the user participates in the target game by spending one of the additional number of times in the first time period, the first resources of the first additional quantity and the first base quantity as well as the second resources of the second additional quantity and the second base quantity may be added at the moment when the user enters the game, and the first resources of the first additional quantity and the first base quantity as well as the second resources of the second additional quantity and the second base quantity may also be added at the moment when the user's game is over. The adding moments of the first resources and the second resources are not limited in this embodiment of this application.

The above method considers the current game level of the user when determining the first additional quantity of the first resources, such that the matching degree between the determined first additional quantity and the user is relatively high, and determination of a quantity of the resources is also relatively flexible, thus enabling the game management process to be relatively flexible. Moreover, determining the first additional quantity based on the current game level of the user enables the determined first additional quantity to be relatively fair. In addition, the determined first additional quantity may further change the game level of the user, such that the determined first additional quantity is associated with the game level of the user, thus further improving the flexibility of game management.

Figure 7:
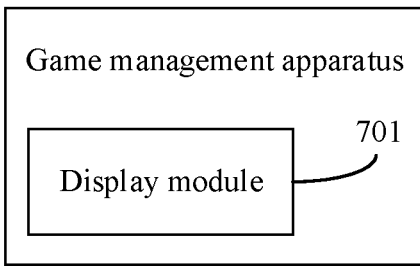
FIG. 7 is a schematic structural diagram of a game management apparatus provided by an embodiment of this application.

FIG. 7 is a schematic structural diagram of a game management apparatus according to an embodiment of this application. As shown in FIG. 7, the apparatus includes:

a display module 701 configured to display a game interface of a target game, the game interface having a first content disapplied thereon in response to that a runtime of the target game is in a first time period and the target game is in a ranking game mode, the first content being used for indicating a base number of times to accelerate the acquisition of first resources that can be applied in the first time period, the accelerating the acquisition of first resources referring to that, based on acquiring the first resources by participating in the target game, the first resources are additionally acquirable when participating in the target game in the first time period; and the display module 701 being further configured to display a second content in response to receiving a selection instruction for the first content, the second content including a first additional quantity of the first resources that are additionally acquirable by spending one of the base number of times in the first time period, the first additional quantity being determined based on a current game level of a user and used for changing a game level of the user.

In one embodiment, the display module 701 is further configured to display a third content, the third content being used for indicating an additional number of times to accelerate the acquisition of first resources that can be applied in the first time period, the additional number of times being determined based on game behavior data in a second time period, and the second time period being earlier than the first time period.

In one embodiment, the apparatus further includes:

an acquisition module, configured to acquire the game behavior data of the user in the second time period;

a determination module, configured to determine game points of the user in the second time period based on the game behavior data of the user in the second time period; and the additional number of times to accelerate the acquisition of first resources that can be applied by the user in the first time period is determined based on the game points of the user in the second time period.

In one embodiment, the determination module is configured to acquire point parameters respectively corresponding to various game behavior data; and determining the game points of the user in the second time period based on number of behaviors respectively corresponding to various game behavior data of the user in the second time period and the point parameters respectively corresponding to various game behavior data.

In one embodiment, the determination module is configured to determine a target point interval where the game points of the user in the second time period are located; and use a number of times corresponding to the target point interval as the additional number of times to accelerate the acquisition of first resources that can be applied by the user in the first time period.

In one embodiment, the acquisition module is further configured to acquire a plurality of candidate contents, each candidate content corresponding to a point interval.

The determination module is further configured to determine contents-to-be-selected among the plurality of candidate contents based on the game points of the user in the second time period, the game points of the user in the second time period being located in a point interval corresponding to the contents-to-be-selected; and determining the third content among the contents-to-be-selected.

In one embodiment, each content-to-be-selected corresponds to a relationship between a number of victories and a number of defeats. The determination module is configured to determine a relationship between a number of victories and a number of defeats of the user in the second time period; and the content-to-be-selected in which the relationship between a number of victories and a number of defeats is consistent with the relationship between a number of victories and a number of defeats of the user in the second time period among the contents-to-be-selected is used as the third content.

In one embodiment, the acquisition module is configured to acquire a number of games applied by the user in a third time period, a start time of the third time period being consistent with a start time of the first time period, and an end time of the third time period being the runtime.

The display module 701 is configured to display the game interface of the target game in response to that the number of games spent is less than a target number of times, the target number of times being determined based on the base number of times to accelerate the acquisition of first resources that can be applied in the first time period and the additional number of times to accelerate the acquisition of first resources that can be applied in the first time period.

In one embodiment, the display module 701 is configured to display a first page in response to receiving the selection instruction for the first content, the first page displaying at least one of time information and number of times information, where the time information is used for indicating a that can be applied time of a remaining number of times to accelerate the acquisition of first resources and determined based on a current time and the end time of the first time period, and the number of times information includes a target number of times to accelerate the acquisition of first resources that can be applied in the first time period and the remaining number of times to accelerate the acquisition of first resources that can be applied in the that can be applied time; and display the second content in response to receiving a selection instruction for the first page.

In one embodiment, the first page further displays the game level of the user, the game level being determined based on a quantity of the first resources acquired by the user.

In one embodiment, the display module 701 is further configured to display a fourth content, the fourth content including a first base quantity of the first resources that are acquirable when participating in the target game.

In one embodiment, the fourth content further includes a second base quantity of second resources that are acquirable when participating in the target game, the second resources being used for acquiring virtual resources.

In one embodiment, the second content further includes a second additional quantity of second resources that are additionally acquirable by spending one of the base number of times in the first time period.

The above apparatus considers the current game level of the user when determining the first additional quantity of the first resources, such that the matching degree between the determined first additional quantity and the user is relatively high, and determination of the resource quantity is also relatively flexible, thus enabling the game management process to be relatively flexible. Moreover, determining the first additional quantity based on the current game level of the user enables the determined first additional quantity to be relatively fair. In addition, the determined first additional quantity may further change the game level of the user, such that the determined first additional quantity is associated with the game level of the user, thus further improving the flexibility of game management.

It is to be understood that, when the apparatus provided in the foregoing embodiment implements the functions of the apparatus, only division of the foregoing function modules is used as an example for description. In the practical application, the functions may be allocated to and completed by different function modules according to requirements. That is, an internal structure of the device is divided into different function modules, to complete all or part of the functions described above. In addition, the apparatus provided in the foregoing embodiment and the method embodiments fall within the same conception. For details of a specific implementation process, reference is made to the method embodiments. Details are not described herein again.

Figure 8:
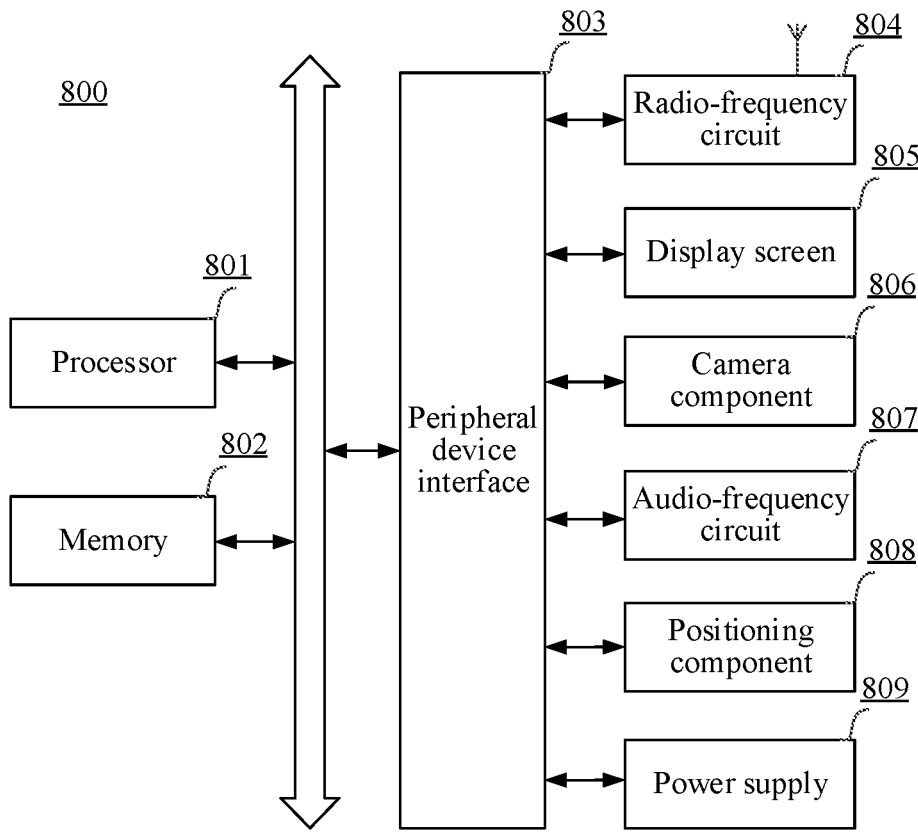
FIG. 8 is a schematic structural diagram of a terminal device provided by an embodiment of this application.

FIG. 8 shows a structural block diagram of a terminal device 800 provided by an embodiment of this application.

Usually, the terminal device 800 includes: a processor 801 and a memory 802.

The processor 801 may include one or more processing cores, for example, a 4-core processor and an 8-core processor. The processor 801 may be implemented in at least one hardware form of a digital signal processing (DSP), a field-programmable gate array (FPGA), and a programmable logic array (PLA). The processor 801 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 801 may be integrated with a graphics processing unit (GPU). The GPU is configured to be responsible for rendering and drawing content that needs to be disapplied on a display screen. In some embodiments, the processor 801 may further include an artificial intelligence (AI) processor configured to process computing operations related to machine learning.

The memory 802 may include one or more computer-readable storage media that may be non-transient. The memory 802 may further include a high-speed random access memory and a nonvolatile memory, for example, one or more disk storage devices or flash storage devices. In some embodiments, the non-transitory computer-readable storage medium in the memory 802 is configured to store at least one instruction, and the at least one instruction is executed by the processor 801 to implement the game management method provided in the method embodiments of this application.

In some embodiments, the terminal device 800 may further optionally include: a peripheral device interface 803 and at least one peripheral device. The processor 801, the memory 802, and the peripheral device interface 803 may be connected through a bus or a signal cable. Each peripheral device may be connected to the peripheral device interface 803 through a bus, a signal cable, or a circuit board. Specifically, the peripheral device includes at least one of a radio frequency circuit 804, a display screen 805, a camera component 806, an audio circuit 807, a positioning component 808, and a power supply 809.

It may be understood by a person skilled in the art that, the structure shown in FIG. 8 constitutes no limitation on the terminal device 800, and the terminal device may include more or fewer components than those shown in the figure, or some components may be combined, or a different component deployment may be used.

Figure 9:
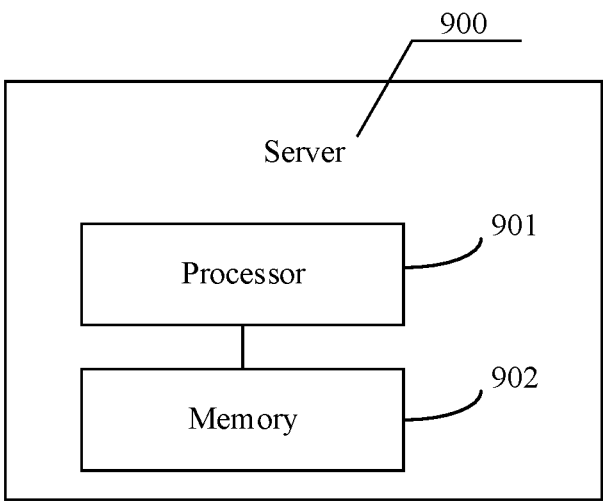
FIG. 9 is a schematic structural diagram of a server provided by an embodiment of this application.

FIG. 9 is a schematic structural diagram of a server provided by an embodiment of this application. The server 900 may vary a lot due to different configurations or performance, and may include one or more central processing units (CPUs) 901 and one or more memories 902. The one or more memories 902 store at least one computer-readable instruction, and the at least one computer-readable instruction is loaded and executed by the one or more CPUs 901 to implement the game management method provided in the foregoing method embodiments. The server 900 may further include components such as a wired or wireless network interface, a keyboard, and an input/output interface, to facilitate input and output. The server 900 may further include other components configured to implement a function of a device. Details are not further described herein.

In one embodiment, a computer-readable storage medium is further provided. The storage medium stores at least one computer-readable instruction, and the at least one computer-readable instruction is loaded and executed by a processor to cause a computer to implement the game management method according to any one of the foregoing method embodiments.

In one embodiment, the computer-readable storage medium above may be a read-only memory (ROM), a random access memory (RAM), a compact disc read-only memory (CD-ROM), a magnetic tape, a floppy disk, an optical data storage device, or the like.

In one embodiment, a computer program or a computer program product is further provided. The computer program or the computer program product stores at least one computer-readable instruction, and the at least one computer-readable instruction is loaded and executed by a processor, to cause a computer to implement the game management method according to any one of the foregoing method embodiments.

The "Plurality of" mentioned herein refers to two or more. "And/or" describes an association relationship of associated objects and represents that three relationships may exist. For example, A and/or B may represent the following three cases: Only A exists, both A and B exist, and only B exists. The character "/" generally represents an "or" relationship between the former and latter associated objects.

The sequence numbers of the foregoing embodiments of this application are merely for description purpose but do not imply the advantages or disadvantages of the embodiments.

The foregoing descriptions are merely exemplary embodiments of this application, but are not intended to limit this application. Any modifications, equivalent replacements, or improvements made within the principle of this application shall fall within the protection scope of this application.

What is claimed is:

1. A method for game management, the method being performed by a terminal device and comprising:

displaying a game interface of a target game, the game interface displaying a first content in response to that a runtime of the target game is in a first time period and the target game is in a ranking game mode, the first content indicating a base number of times to accelerate an acquisition of first resources that can be applied in the first time period;

displaying a second content in response to receiving a selection instruction for the first content, the second content comprising a first additional quantity of the first resources acquirable by playing one of the base number of times in the first time period, the first additional quantity being determined based on a current game level of a user and used for changing a game level of the user; and displaying a third content, the third content indicating an additional number of times to accelerate the acquisition of the first resources that can be applied in the first time period, the additional number of times being determined based on game behavior data in a second time period, and the second time period being earlier than the first time period.

2. The method according to claim 1, further comprising:

acquiring game behavior data of the user in the second time period;

determining game points of the user in the second time period based on the game behavior data of the user in the second time period; and determining, based on the game points of the user in the second time period, the additional number of times to accelerate the acquisition of first resources that can be applied by the user in the first time period.

3. The method according to claim 2, wherein the determining game points of the user in the second time period based on the game behavior data of the user in the second time period comprises:

acquiring point parameters respectively corresponding to a plurality of game behavior data; and determining the game points of the user in the second time period based on number of behaviors respectively corresponding to a plurality of game behavior data of the user in the second time period and the point parameters respectively corresponding to the plurality of game behavior data.

4. The method according to claim 2, wherein the determining, based on the game points of the user in the second time period, the additional number of times to accelerate the acquisition of first resources that can be applied by the user in the first time period comprises:

determining a target point interval where the game points of the user in the second time period is located; and using, based on pre-stored correspondence between point intervals and number of times, a number of times corresponding to the target point interval as the additional number of times to accelerate the acquisition of first resources that can be applied by the user in the first time period.

5. The method according to claim 1, further comprising:

acquiring a plurality of candidate contents, each candidate content corresponding to a point interval;

determining contents-to-be-selected among the plurality of candidate contents based on the game points of the user in the second time period, the game points of the user in the second time period being located in a point interval corresponding to the contents-to-be-selected; and determining the third content among the contents-to-be-selected.

6. The method according to claim 5, wherein each content-to-be-selected corresponds to a relationship between a number of victories and a number of defeats; and the relationship between a number of victories and a number of defeats is a magnitude relationship between a number of victories and a number of defeats; the determining the third content among the contents-to-be-selected comprises:

determining a relationship between a number of victories and a number of defeats of the user in the second time period;

determining a target content-to-be-selected from the contents-to-be-selected, and using the target content-to-be-selected as the third content; a relationship between a number of victories and a number of defeats corresponding to the target content-to-be-selected being consistent with a relationship between a number of victories and a number of defeats of the user in the second time period.

7. The method according to claim 1, wherein the displaying a game interface of a target game comprises:

acquiring a number of games applied by the user in a third time period, a start time of the third time period being consistent with a start time of the first time period, and an end time of the third time period being the runtime; and displaying the game interface of the target game in response to that the number of games applied is fewer than a target number of times, the target number of times being determined based on the base number of times to accelerate the acquisition of first resources that can be applied in the first time period and the additional number of times to accelerate the acquisition of first resources that can be applied in the first time period.

8. The method according to claim 1, wherein the displaying a second content in response to receiving a selection instruction for the first content comprises:

displaying a first page in response to receiving the selection instruction for the first content, the first page displaying at least one of time information and number of times information, wherein the time information indicating time that can be applied towards a remaining number of times to accelerate the acquisition of first resources and is determined based on a current time and the end time of the first time period, and the number of times information comprises a target number of times to accelerate the acquisition of first resources that can be applied in the first time period and the remaining number of times to accelerate the acquisition of first resources in the time that can be applied; and displaying the second content in response to receiving a selection instruction for the first page.

9. The method according to claim 8, wherein the first page further displays the game level of the user, the game level being determined based on a quantity of the first resources acquired by the user.

10. The method according to claim 1, further comprising:

displaying a fourth content, the fourth content comprising a first base quantity of the first resources acquirable when participating in the target game.

11. The method according to claim 10, wherein the fourth content further comprises a second base quantity of second resources acquirable when participating in the target game, the second resources being used for acquiring virtual resources.

12. The method according to claim 1, wherein the second content further comprises a second additional quantity of second resources that are acquirable by playing one of the base number of times in the first time period.

13. An electronic device, comprising one or more processors and a memory, the memory storing at least one computer-readable instruction, the at least one computer-readable instruction being loaded and executed by the one or more processors, to cause the electronic device to implement:

displaying a game interface of a target game, the game interface displaying a first content in response to that a runtime of the target game is in a first time period and the target game is in a ranking game mode, the first content indicating a base number of times to accelerate an acquisition of first resources that can be applied in the first time period;

displaying a second content in response to receiving a selection instruction for the first content, the second content comprising a first additional quantity of the first resources acquirable by playing one of the base number of times in the first time period, the first additional quantity being determined based on a current game level of a user and used for changing a game level of the user; and displaying a third content, the third content indicating an additional number of times to accelerate the acquisition of the first resources that can be applied in the first time period, the additional number of times being determined based on game behavior data in a second time period, and the second time period being earlier than the first time period.

14. The electronic device according to claim 13, wherein the one or more processors are further configured to implement:

acquiring game behavior data of the user in the second time period;

determining game points of the user in the second time period based on the game behavior data of the user in the second time period; and determining, based on the game points of the user in the second time period, the additional number of times to accelerate the acquisition of first resources that can be applied by the user in the first time period.

15. The electronic device according to claim 14, wherein the determining game points of the user in the second time period based on the game behavior data of the user in the second time period comprises:

acquiring point parameters respectively corresponding to a plurality of game behavior data; and determining the game points of the user in the second time period based on number of behaviors respectively corresponding to a plurality of game behavior data of the user in the second time period and the point parameters respectively corresponding to the plurality of game behavior data.

16. A non-transitory computer-readable storage medium, storing at least one computer-readable instruction, the at least one computer-readable instruction being loaded and executed by one or more processors, to cause a computer to implement:

displaying a game interface of a target game, the game interface displaying a first content in response to that a runtime of the target game is in a first time period and the target game is in a ranking game mode, the first content indicating a base number of times to accelerate an acquisition of first resources that can be applied in the first time period;

displaying a second content in response to receiving a selection instruction for the first content, the second content comprising a first additional quantity of the first resources acquirable by playing one of the base number of times in the first time period, the first additional quantity being determined based on a current game level of a user and used for changing a game level of the user; and displaying a third content, the third content indicating an additional number of times to accelerate the acquisition of the first resources that can be applied in the first time period, the additional number of times being determined based on game behavior data in a second time period, and the second time period being earlier than the first time period.

17. The computer-readable storage medium according to claim 16, wherein the displaying a game interface of a target game comprises:

acquiring a number of games applied by the user in a third time period, a start time of the third time period being consistent with a start time of the first time period, and an end time of the third time period being the runtime; and displaying the game interface of the target game in response to that the number of games applied is fewer than a target number of times, the target number of times being determined based on the base number of times to accelerate the acquisition of first resources that can be applied in the first time period and the additional number of times to accelerate the acquisition of first resources that can be applied in the first time period.

18. The computer-readable storage medium according to claim 16, wherein the displaying a second content in response to receiving a selection instruction for the first content comprises:

displaying a first page in response to receiving the selection instruction for the first content, the first page displaying at least one of time information and number of times information, wherein the time information indicating time that can be applied towards a remaining number of times to accelerate the acquisition of first resources and is determined based on a current time and the end time of the first time period, and the number of times information comprises a target number of times to accelerate the acquisition of first resources that can be applied in the first time period and the remaining number of times to accelerate the acquisition of first resources in the time that can be applied; and displaying the second content in response to receiving a selection instruction for the first page.

* * * * *